United States Patent [19]
Somville

[11] Patent Number: 6,134,965
[45] Date of Patent: Oct. 24, 2000

[54] DEVICE FOR MEASURING AT LEAST ONE PHYSICAL PARAMETER RELATING TO A PROPELLED GAME BALL

[75] Inventor: Pierre Noël Somville, Delle, France

[73] Assignee: Raymond Joseph Somville, Porrentruy, Switzerland

[21] Appl. No.: 09/068,375

[22] PCT Filed: Nov. 8, 1996

[86] PCT No.: PCT/FR96/01765

§ 371 Date: May 8, 1998

§ 102(e) Date: May 8, 1998

[87] PCT Pub. No.: WO97/17590

PCT Pub. Date: May 15, 1997

[30] Foreign Application Priority Data

Nov. 8, 1995 [FR] France ................................. 95 13372

[51] Int. Cl.[7] .......................... G01H 17/00; A63B 61/00
[52] U.S. Cl. ............................ 73/570; 73/649; 73/488; 73/DIG. 4; 473/461; 473/463
[58] Field of Search ............................. 73/649, 570, 579, 73/379.01, 379.04, 488, 489, DIG. 4; 473/463, 461, 459, 221, 223

[56] References Cited

U.S. PATENT DOCUMENTS

| | | | |
|---|---|---|---|
| 4,088,324 | 5/1978 | Farmer | 273/186 A |
| 4,801,880 | 1/1989 | Koike | 324/178 |
| 4,822,042 | 4/1989 | Landsman | 473/463 |
| 4,870,868 | 10/1989 | Gastgeb et al. | 73/649 |
| 4,940,236 | 7/1990 | Allen | 473/223 |
| 4,991,850 | 2/1991 | Wilhelm | 273/186 A |
| 5,332,225 | 7/1994 | Ura | 473/223 |
| 5,796,005 | 8/1998 | Frolow | 73/651 |

FOREIGN PATENT DOCUMENTS 34 36 218 A   4/1985   Germany .

*Primary Examiner*—Richard A. Moller
*Attorney, Agent, or Firm*—Davis and Bujold

[57] ABSTRACT

A device (1) for measuring the strike velocity of a game ball struck by a striking element, particularly a tennis racket (2), said device being provided directly on the racket. The device comprises at least one measuring sensor mounted on the strings (4) of the racket (2) and arranged to output signals for the strength of the vibrations generated by the ball, means for processing said signals using microprocessors that analyse the signals and determine a measured value of the ball velocity, and means (6) for displaying said value. The processing means comprise a calibrating unit for automatically correcting the measured value depending on at least the features of the racket and the ball in order to provide a highly accurate and reliable result. Said measuring device is miniaturised and inexpensive and fits in a small housing (3) mounted on the racket (2) to enable the player to read the velocity value directly. The device is useful in any sport or game involving a projectile and a striking element, particularly in tennis.

10 Claims, 4 Drawing Sheets

DEVICE FOR MEASURING AT LEAST ONE PHYSICAL PARAMETER RELATING TO A PROPELLED GAME BALL

BACKGROUND OF THE INVENTION

The present invention relates to a device for measuring at least one physical parameter relating to a game ball propelled by means of a striking element, in particular a tennis racket, as well as a tennis racket fitted with such a measuring device, this device comprising at least one measuring sensor mounted on the said striking element and designed to send signals corresponding to said physical parameter to be measured, means of processing these signals designed to analyse the signals sent by the measuring sensor and to work out a measured value of said physical parameter and display means for displaying this value, the measuring sensor being designed to detect the vibrations caused by the ball propelled by the striking element and comprising a piezoelectric element designed to send sinusoidal electric signals in proportion to the severity of the vibrations detected.

"Physical parameter" means in particular the speed of an appropriate ball propelled by a corresponding striking element, or any other variable such as the force with which the ball is struck or similar. The invention can therefore apply to all games or sports involving a ball and a striking element, such as tennis, golf, baseball, ice hockey, and table tennis along with others, with no limitation. Tennis has been chosen as an example of an application in the present invention.

It is well known in the sporting world that players are continually striving to improve their performances. This is why we seek to develop means of measuring, calculating and comparing these performances. Nevertheless, at the present time, there are no means available making it possible to sufficiently accurately and reliably measure the speed of a ball in real time during a game. In high-level sporting events, it is common to use radars placed at the edge of the playing area. The latter require considerable investment and provide results whose error margin of approximately 20% makes them unusable. Stopwatches are also used, which make it possible to work out the speed of the ball by integrating the distance and the time. However, this system is too complicated to manage.

There are nevertheless some measuring devices provided in a striking element such as a racket or a golf club which are designed to measure the force with which a ball is struck or the ball's point of impact on the striking element. These devices are described in particular in the following publications DE-A-34 36 218, U.S. Pat. No. 4,991,850, U.S. Pat. No. 4,870,868 and U.S. Pat. No. 4,008,324. However, none of them is designed to instantaneously provide a measured value corresponding to the speed with which a ball is struck.

The aim of the present invention is to overcome the above-mentioned drawbacks by proposing a very inexpensive measuring device, which is extremely compact and can be fully fitted onto the striking element, capable of instantaneously providing a value for said physical parameter by way of a real-time measurement, ensuring accuracy to within about 5%, and able to be calibrated quickly according to the type of striking element and the type of game ball without the need for additional, sophisticated calibrating equipment.

The aim is achieved by a measuring device as described in the preamble and characterised in that the physical parameter corresponds to the speed at which the game ball is struck.

SUMMARY OF THE INVENTION

In a preferred form of embodiment, the means of processing the signals comprise at least one electronic analyser coupled to said measuring sensor and designed to transform the electric signals sent by the sensor into a measured value of the real speed at which the ball is struck, and, at least one microcontroller coupled to the electronic analyser and to said display means, this microcontroller being designed to automatically correct said mesured value according to at least the type of striking element and the type of game ball, the analyser and the microcontroller being designed to operate interactively.

Preferably, the electronic analyser comprises means of applying a calculation algorithm designed to interpret the electric signals sent by the sensor and to work out the measured value of the real speed of the ball.

The microcontroller, favourably, comprises a calibrating unit designed to automatically initialise the electronic analyser according to the type of striking element, i.e. the type and tension of the strings and the type of game ball.

Further, it has at least two operating modes selected using a push-button, in particular a calibrating mode and a normal operating mode.

This microcontroller is also designed to detect and identify a possible game fault or a possible defect in the striking element.

This microcontroller advantageously comprises a storage unit designed to store the last values measured in the memory.

According to the preferred form of embodiment, the display means comprise a digital screen designed to display a momentary measured value of the speed of the ball or successively the last values stored as well as the operating mode of the processing means using corresponding symbols, and the possible game faults and/or striking element defects using corresponding lightspots.

The measuring device can comprise an integrated transmitter designed to transmit the measured values and other information to any processing and/or display medium equipped with a suitable receiver.

The aim of the invention is also achieved by a tennis racket characterised in that it comprises at least one measuring device as described previously, in which the sensor is coupled on the one hand to the racket's strings and on the other hand to the signal processing and display means.

In a first form of embodiment, the sensor is imbedded in a holding piece made of flexible synthetic material mounted between at least two of the racket's strings and the signal processing and display means are assembled in a housing mounted on said racket so that the display means can be seen by the player.

In a second form of embodiment, the measuring sensor and processing and display means are incorporated into a housing in synthetic material mounted on the racket's strings.

BRIEF DESCRIPTION OF THE DRAWINGS

The present invention and its advantages shall be more fully disclosed in the following description of an example of embodiment, with reference to the attached drawings, in which.

DESCRIPTION OF THE PREFERRED EMBODIMENTS

Figure 1:
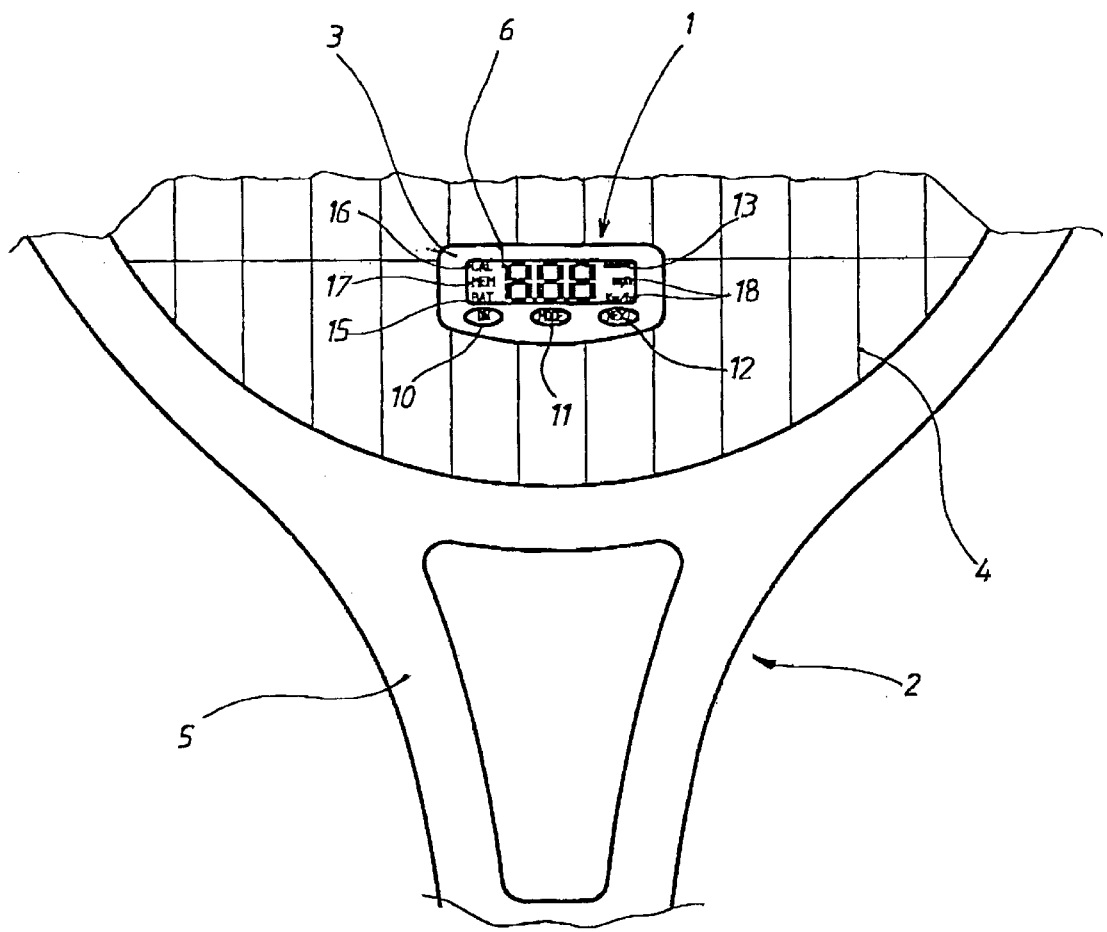
FIG. 1 is a partial view of a tennis racket fitted with a measuring device according to the invention.
Figure 1A:
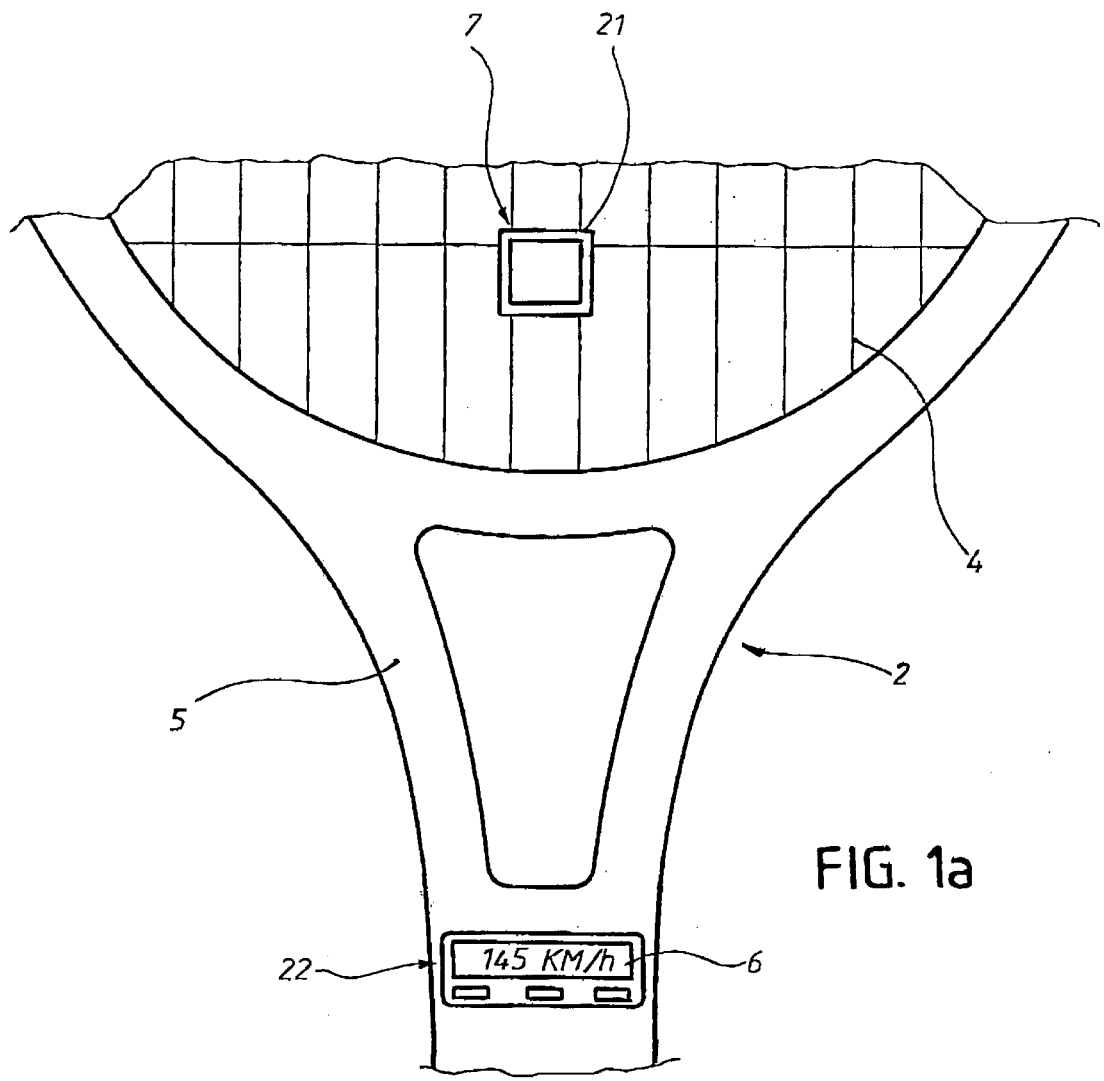
FIG. 1a is a partial view of a tennis racket fitted with a measuring device according to an alternative embodiment of the invention.
Figure 1B:
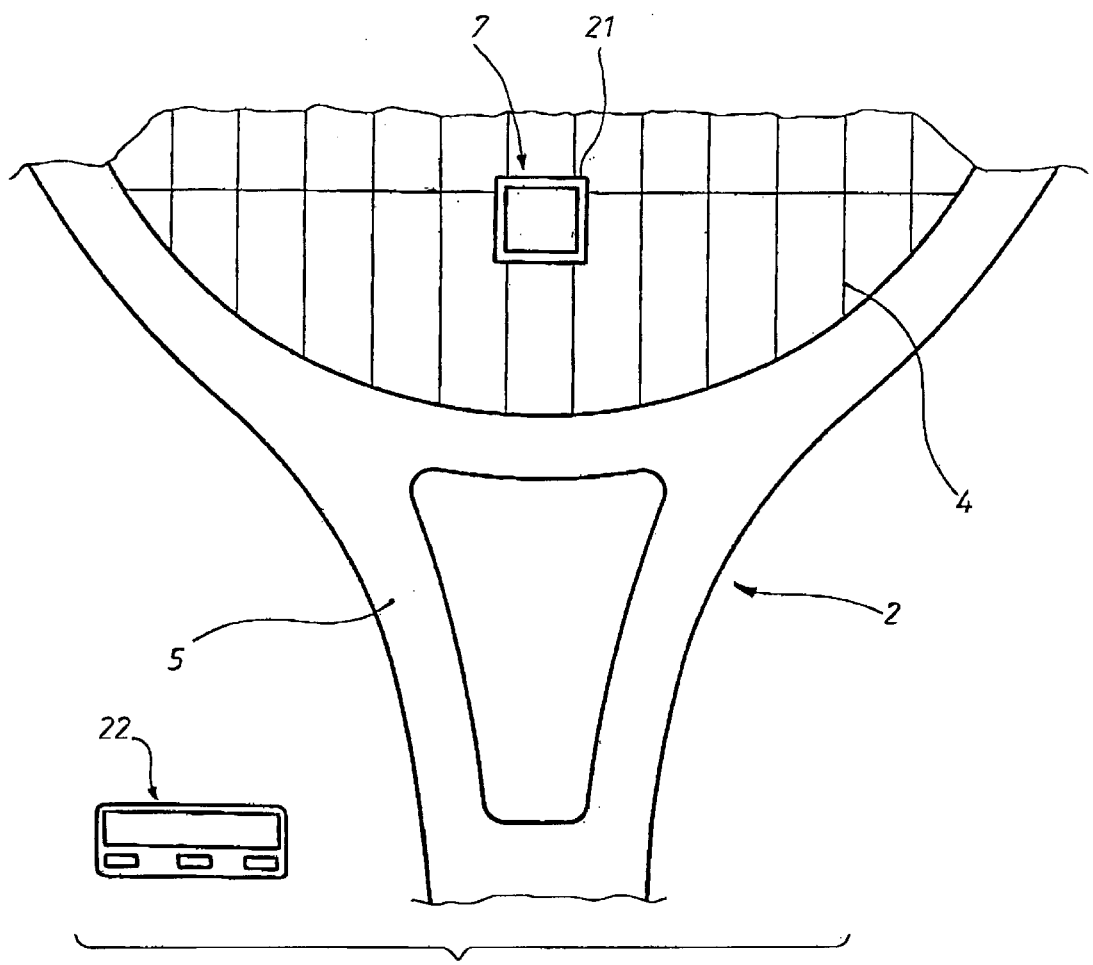
FIG. 1b is a partial view of a tennis racket fitted with a measuring device according to an alternative embodiment of the invention.

With reference to FIG. 1, the measuring device 1 according to the invention is for example designed to measure the speed of a tennis ball propelled by a tennis racket 2 by a forehand drive, backhand drive or a service. It is designed to be incorporated into a housing 3 made of a synthetic material such as a resin, to be mounted on the tennis racket's 2 strings 4 in the vicinity of its handle 5. The visible parts of the measuring device 1 comprise in particular a digital display screen 6 on which the player can directly read the measured value of the speed at which the ball is struck along with other information which shall be dealt with in detail below. It can easily be seen, with reference to this Figure, that the measuring device 1 is miniaturised and can fit in a very compact housing 3, e.g. 18 mm by 40 mm.

Figure 2:
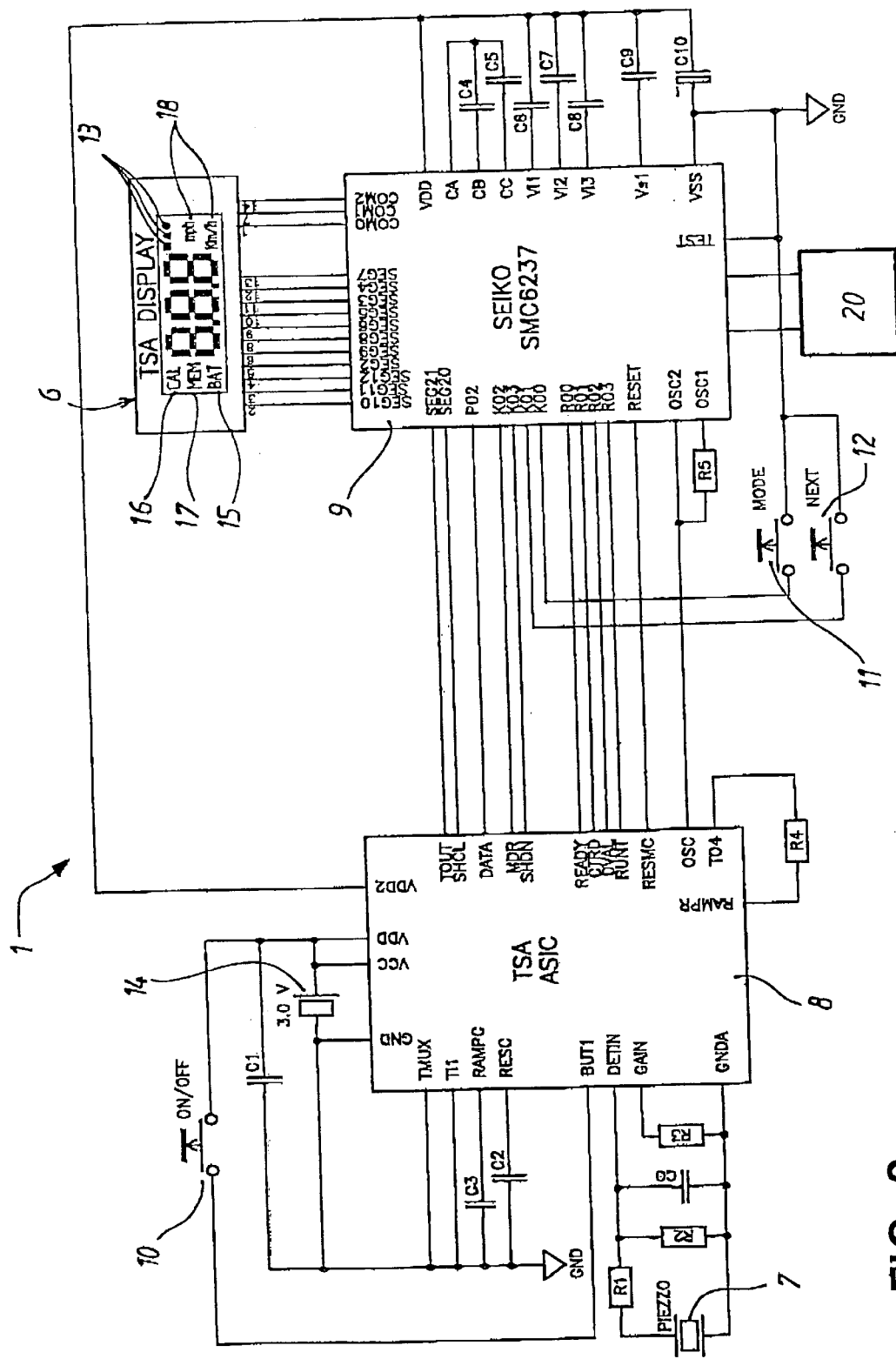
FIG. 2 is a circuit diagram of said measuring device.

FIG. 2 illustrates in detail the circuit diagram of this measuring device 1. It primarily comprises a piezoelectric type measuring sensor 7, an integrated microprocessor type electronic analyser (ASIC : integrated circuit according to the American Standards Institute), an integrated microprocessor type (SEIKO®) microcontroller 9 and a digital liquid crystal display screen 6. This measuring device 1 is activated by a first push-button 10 called "DN" on/off, which is accessible on the front of the housing 3.

The measuring sensor 7 sends a sinusoidal electrical signal the voltage, amplitude and frequency of the peaks of which correspond to the severity of the racket's 2 strings' vibrations which are caused when the ball is struck. This signal is sent to the analyser 8 which, by means of a calculation algorithm, integrates it to obtain a signal dynamic range taking into account its voltage, its frequency and its amplitude, and then converts it into a measured value corresponding to the speed of the ball.

In the same way, the microcontroller 9 comprises an integrated calibration unit which makes it possible to initialise the analyser 8 in particular according to the type of racket, i.e. the type and tension of the strings, the type of game ball and even the environment. Using this calibration unit, the measuring device 1 can be used reliably for all tennis rackets and all sorts of balls, whatever their technical characteristics. It is therefore necessary for the calibration operation to be carried out before this device is used for the first time. The calibration unit is activated by a second push-button 11 called "MODE" which is accessible on the front of the housing 3. It is used to record the severity of the vibrations created by a tennis ball which is dropped from the height of the tennis net onto the strings 4 of the racket 2 laid on the ground, whilst knowing the speed of the former. The data gathered by this calibration unit, i.e. the voltage, frequency and amplitude of the electrical signal then make it possible to compare and interpret the electrical signals sent by the measuring sensor 7, in normal game operating mode, according to the type and tension of the strings of the tennis racket used, as well as according to the type of ball and the environment. Thus, the measured value of the speed at which the ball is struck is calculated with the greatest possible accuracy. The analyser 8 and the microcontroller 9 are therefore designed to work interactively and therefore make it possible to obtain very reliable and very accurate measured values.

The measured value of the speed is then displayed on the digital display screen 6 in kilometers per hour or in miles per hour. The unit of measurement is selected by using a third push-button 12 called "NEXT" which is accessible of the front of the housing 3.

The microcontroller 9 comprises an integrated detection unit designed to detect when the ball is not struck properly, is off-centre or on the frame, and even depreciation in the tension of the strings 4 of the tennis racket 2 by recognising the changing frequency of the signal sent by the piezoelectric measuring sensor 7. The game faults are viewed by the player on the screens by means of light spots 13 of different shapes to quickly identify the fault in question. These spots are for example square, triangle and round-shaped, each corresponding to the signalling of a precise fault. This detection unit is also designed to distinguish waiting strikes from game strikes to avoid processing them and storing them in the memory. The waiting strikes are distinguished by the fact that they are directed perpendicular to the strings 4 of the racket 2 and are weak.

The microcontroller 9 also comprises a storage unit which is designed to keep the last measured values of the speed at which the ball was struck in the memory, e.g. the last ten values. The player can successively view these stored values on the digital display screen 6 using the push-button 11 called "MODE".

The measuring device 1 is fed by a battery 14 which can last for a relatively long time, e.g. five years. A battery indicator 15 is provided on the digital display screen 6 in the shape of the "BA" symbol which lights up when the battery's voltage drops.

The digital liquid crystal display screen 6 is also provided with other information symbols for the player. The "CAL" symbol 16 indicates that the measuring device 1 is in calibration mode. The "MEM" symbol 17 indicates that the measuring device is in memorisation mode. The "mph" and "km/h" symbols 18 specify the unit in which the value of the speed is given.

FIG. 2 clearly illustrates how the various components of the measuring device 1 are connected to one another, either directly, or through the intermediary of additional components such as capacitors and resistors arranged in a manner known to an expert.

It has been previously seen that the measuring device 1 can be integrated into a housing 3 mounted on the strings 4 of a racket 2. This device can advantageously be supplemented by a transmitter (not shown) designed to transmit the measured values to any other processing and/or display device fitted with a receiver, such as a television to transmit the information during a match, a computer to remotely process the information, a giant screen provided on the tennis court to inform the spectators, a watch to make it easier for the player himself or a third party to read the information.

This list of possibilities is in no way restrictive and all kinds of variations can be considered.

The measuring device 1 as described previously is designed to fit both new rackets leaving the factory and those already purchased beforehand. The measuring device 1 can therefore come in many versions so as to meet the various requirements. As shown by FIG. 1, the measuring device 1 can come in a housing 3 which is mounted straight on the strings 4 of the racket 2. Another version would involve having just the measuring sensor 7 being designed to be mounted on the strings by means of a flexible medium, such as a piece made of rubber, generally used as an antivibrator, and having the processing means 8, 9 and display means 6 being assembled in an independent housing designed to be mounted directly or fixed by the user in the handle 5, on the handle or on the edge of the racket 2 depending on whether the measuring device is proposed on a new racket or after it has been purchased. In this version, the measuring sensor 7 and the housing are connected electrically by a link which can easily be fixed on the frame of the racket 2.

The present invention is not limited to the example of embodiment described above but can be widened to include any modification or variation which is obvious for the expert.

I claim:

1. A device for measuring at least one physical parameter relating to a game ball propelled by means of a striking element, in particular a tennis racket, this device comprising at least one measuring sensor (7) designed to send signals corresponding to said physical parameter to be measured, means of processing (8, 9) these signals designed to analyze the signals sent by the measuring sensor (7) and to work out a measured value of said physical parameter and the display means (6) for displaying this value, the measuring sensor (7) being designed to detect the vibrations caused by the ball propelled by the striking element (2) and comprising a piezoelectric element designed to send sinusoidal electric signals in proportion to the severity of the vibrations detected, the physical parameters measured corresponding to the speed at which the game ball is struck, wherein:

the means of processing the signals comprises at least one electronic analyzer (8) coupled to said measuring sensor (7) and designed to transform the electric signals sent by the sensor into a measured value of the real speed at which the ball is struck, and, at least one microcontroller (9) coupled to the electronic analyzer (8) and to said display means (6);

the microcontroller (9) comprises a calibrating unit designed to initialize the electronic analyzer according to the type of striking element (2), like the type and tension of the strings and the type of game ball so as to automatically and instantaneously provide the correct said measured value of the speed of the ball; and the analyzer (8) and the microcontroller (9) are designed to operate interactively.

2. A device according to claim 1, wherein the electronic analyzer (8) comprises applies a calculation algorithm designed to interpret the electric signals sent by the measuring sensor (7) and to work out said measured value of the real speed of the ball.

3. A device according to claim 1, wherein the microcontroller (9) has at least two operating modes selected using push-buttons (11, 12), in particular a calibrating mode and a normal operating mode.

4. A device according to claim 1, wherein the microcontroller (9) comprises a detection unit designed to distinguish and identify a possible game fault and/or a possible defect in the striking element (2).

5. A device according to claim 1, wherein the microcontroller (9) advantageously comprises a storage unit designed to store the last measured values of the speed of the ball in memory.

6. A device according to claim 1, wherein the display means comprise a digital liquid crystal display screen (6) designed to display the momentary measured value of the speed of the ball or the last successive stored values of the speed of the ball, as well as the operating mode of the processing means using corresponding symbols (16, 17) and at least one of possible game faults and striking element defects using corresponding lightspots (13).

7. A device according to claim 1, comprising an integrated transmitter (20) designed to transmit the measured values of the speed of the ball and other information to at least one of processing and display medium equipped with a suitable receiver.

8. A tennis racket (2) wherein said tennis racket (2) comprises at least one measuring device (1) according to claim 13, said sensor (7) being coupled on the one hand to the racket's (2) strings (4) and on the other hand to the signal processing means (8, 9) and display means (6).

9. A tennis racket according to claim 8, wherein the sensor (7) is imbedded in a holding piece (21) made of flexible synthetic material, mounted between at least two of the racket's strings and the processing means (8, 9) and display means (6) are assembled in a housing (22) mounted on said racket so that the display means can be seen by the player.

10. A tennis racket according to claim 8, wherein the measuring sensor (7) and the processing means (8, 9) and display means (6) are incorporated into a housing (3) in synthetic material mounted on the racket's (2) strings (4).

* * * * *